United States Patent [19]

Eberspaecher

[11] Patent Number: 4,715,026

[45] Date of Patent: Dec. 22, 1987

[54] CIRCUIT ARRANGEMENT FOR A COMMUNICATIONS SYSTEM FOR THE TRANSMISSION OF MESSAGE INFORMATION FROM NARROWBAND AND BROADBAND TERMINAL EQUIPMENT WITHIN A LOCAL NETWORK CONSTRUCTED AS A LOOP

[75] Inventor: Joerg Eberspaecher, Munich, Fed. Rep. of Germany

[73] Assignee: Siemens Aktiengesellschaft, Berlin and Munich, Fed. Rep. of Germany

[21] Appl. No.: 860,580

[22] Filed: May 7, 1986

[30] Foreign Application Priority Data

May 9, 1985 [DE] Fed. Rep. of Germany ....... 3517006

[51] Int. Cl.$^4$ .............................................. H04J 15/00
[52] U.S. Cl. .......................................... 370/1; 370/58; 370/88
[58] Field of Search .......................... 370/1, 58, 86, 88

[56] References Cited

U.S. PATENT DOCUMENTS 4,257,119 3/1981 Pitroda ................................. 370/58
4,583,218 4/1986 Ardon et al. ......................... 370/58

Primary Examiner—Joseph A. Orsino, Jr.
Attorney, Agent, or Firm—Hill, Van Santen, Steadman & Simpson

[57] ABSTRACT

A circuit arrangement is provided for a communications system for transmitting serial bit message information, particularly for multiplex data transmitted within optical transmission systems, by way of which local networks having loop configurations and equipped with corresponding switching devices, a plurality of terminal equipment processing different types of communication being connectible to the local network in an arbitrary combination with one another, the plurality being adapted to the different types of communication with respect to quantity of data transmission and data transmission rate within a frame, and in view of the method of transmission. Considering the maximum quantity of data to be transmitted via a frame within a defined time, the loop network is sub-divided into loop sub-networks in which at least one broadband subscriber terminal and a plurality of narrow band subscriber terminals are provided supplementing one another up to the maximum data quantity in each loop sub-network, whereby the data of the broadband subscriber terminal are gated out by way of a sub-loop interface device and are centrally switched via a centrally-controlled broadband space switching matrix network device and are again gated back into the corresponding sub-network.

3 Claims, 5 Drawing Figures

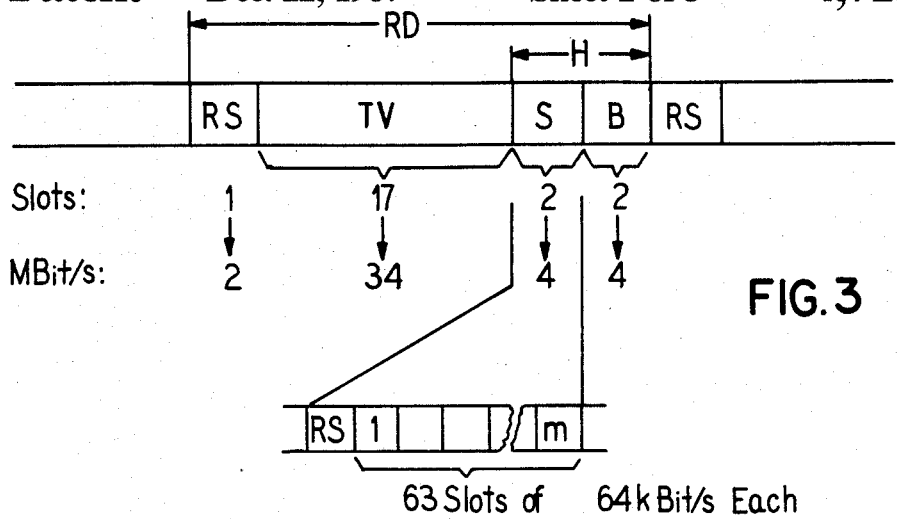
FIG. 3
Exemplary Data Rate: ~45 MBit/s
TV: 1 TV
S: Stream-Subchannel
B: Burst-(Token-)-Subchannel
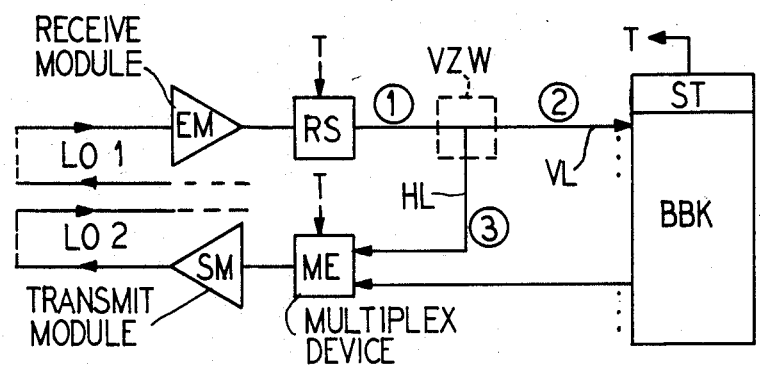
FIG. 4
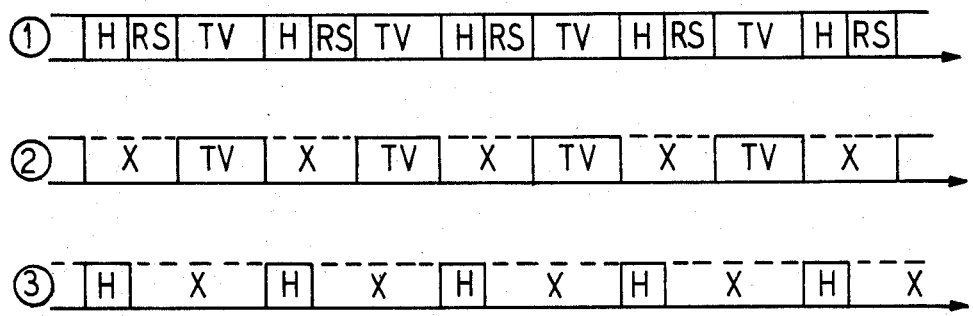

CIRCUIT ARRANGEMENT FOR A COMMUNICATIONS SYSTEM FOR THE TRANSMISSION OF MESSAGE INFORMATION FROM NARROWBAND AND BROADBAND TERMINAL EQUIPMENT WITHIN A LOCAL NETWORK CONSTRUCTED AS A LOOP

BACKGROUND OF THE INVENTION

1. Field of the Invention

The present invention relates to a circuit arrangement for a communications system for the transmission of serial bit message information, particularly of multiplex data transmitted within optical transmission systems, via local networks having loop configurations and equipped with corresponding switching devices, a plurality of terminal equipment processing different types of information being connectible to the local network in arbitrary combination with one another, the plurality of terminal equipment being adapted to the different types of communication in view of quantity of data transmission and the data transmission rate within a frame, as well as in view of the method of transmission.

2. Description of the Prior Art

A communications system of the general type set forth above is known from the German published application No. 33 04 823 in which different subscriber terminal equipment which can exchange messages with one another are connected to a light waveguide network configured as a loop. The exchange of the messages thereby occurs without the involvement of a centrally-provided exchange controller and can optionally occur with the assistance of a continuous transmission method and/or of a packet transmission method. What is referred to as the hybrid method in which a synchronously-circulating pulse frame is divided into two sub-frames, the so-called stream frame and burst frame, within the loop network is utilized for designational transmission of the data between the terminal equipment. The first of these sub-frames is thereby composed of (m−1) time slots (time channels) and serves for the transmission of continuous signals such as, for example, digitized signals having data rates of, for example, 64 kbit/s per time slot. The second sub-frame is not subdivided and can be operated, for example, with a data rate of 4.096 Mbit/s. The second sub-frame serves, first of all, for the signaling of the channels of the first sub-frame, for example for call setup and call cleardown, and also serves for fast data exchange between modern office equipment which must send or, respectively, receive greater quantity of data in bursts at certain times. The second sub-frame is operated in accordance with what is referred to as the token method.

Since, based on its very principle, the hybrid method is not limited in data rate, a data rate far higher than, for example, 8 Mbit/s can also be used in such a loop network.

Under the precondition that moving picture communication, i.e. picture telephone, picture monitoring, picture conferencing, etc, is also to be transmitted in future "integrated" communications networks, the picture information must be digitized, as is the other voice and data information.

It is known for connecting the individual broadband terminal equipment, to connect the same to a centrally-disposed broadband switching matrix arrangement and to through-connect the corresponding routes via the switching matrix network for the duration of the transmission. An individual line group comprising, for example, a picture channel plus a few narrow band channels which are likewise switched via the central exchange therefore leads to every such broadband subscriber. Under the assumption that the broadband channel can be based on a data rate of 34 Mbit/s and a further 4 Mbit/s rate can be used for the narrow band channels, a data rate of about 38 Mbit/s derives on the forward line or, respectively, on the return line of the communications system. Since both the broadband communications and the narrow band connections must be through-connected via the centrally-controlled switching system, no fast data communication can be achieved within such a communications system due to the lacking bus structure despite the existing, high data rates because of the times for the call setup or, respectively, call cleardown are too high due to the centralization.

If, on the other hand, data were to be transmitted simultaneously on a single loop-shaped line over a plurality of broadband channels having data rates of 34 Mbit/s per channel in accordance with the known method (hybrid method), then a sum data rate of $k \times 34$ Mbit/s i.e. 340 Mbit/s for $k=10$ channels, would derive here plus the data rate of the narrow band channel (burst subchannel) of, for example, 4 Mbit/s.

Such data rates, however, cannot be economically governed at present or in the foreseeable future with the presently-available optical and electronic switching components.

SUMMARY OF THE INVENTION

Since, however, as set forth above, moving picture communication should also be possible in future communications systems in addition to the data transmission for voice, text, etc, the object of the present invention is to provide a circuit arrangement wherein it is possible with economical points of view to additionally transmit the data for the moving picture communication upon the greatest possible retention of the hybrid method and given utilization of currently-available optical and electronic switching components within the communications systems initially defined.

The above object is achieved, according to the present invention, by an arrangement which is characterized by a combination of the following features:

1. Upon consideration of the maximum quantity of data to be transmitted via a frame within a defined time, the loop network is divided into loop sub-networks and at least one broadband subscriber terminal and a plurality of narrow band subscriber terminals supplementing one another up to the maximum data quantity are contained within every loop sub-network;

2. Every loop sub-network comprises a subloop interface device acquiring the data of the broadband subscriber terminal and the data of the narrow band subscriber terminals, the subloop interface device having its transmitting side and its receiving side connected to a centrally-controlled broadband space switching matrix network device and having its transmitting side connected to a receiving input of the sub-loop interface device of the respectively following loop sub-network or, respectively, having its receiving side connected to a transmitting output of the subloop interface device of the respectively preceding loop sub-network;

3. The subloop interface device comprises a frame matching unit which augments the transit time in the loop sub-network to a whole multiple of the frame duration and comprises a multiplex device combining receive data of the broadband space switching matrix network device and of the corresponding loop sub-network to form a new, complete frame; and 4. A central narrow band station which controls the call setup and cleardown between the broadband subscriber terminal via the broadband space switching matrix network device is provided in one of the loop sub-networks.

With the division of the loop network into individual sub-networks in each of which a broadband subscriber terminal and a defined plurality of narrow band subscriber terminals are contained, the message information transmission between the corresponding terminals can occur with the use of the sub-loop interface device, regardless of the respectively required data transmission rate. The data of the narrow band subscriber terminals are thereby transmitted within the decentrally-controlled loop structure, whereas the data of the broadband subscriber terminal equipment are gated out of this composite loop and are conducted via the centrally-controlled broadband space switching matrix network device. According to the invention, located within the sub-loop interface device, in addition to the frame matching unit, is the multiplex device to which, in addition to the data of the narrow band subscriber terminals from the sub-networks, the gated-out data of the broadband subscriber terminal are resupplied from the broadband space switching matrix network device. What is therefore essential to the invention is the combination of the decentrally-controlled loop structure for the data of a narrow band subscriber terminals with a centrally-controlled switching of the data for the broadband subscriber terminal via the broadband space switching matrix network device. The loop-configured network, which is therefore divided into sub-networks laid out sub-shaped; is operated in the autonomous and decentrally-controlled loop for the narrow band subscriber terminals in that, in accordance with the quantity of data to be transmitted, the narrow band subscriber terminals are either assigned a corresponding slot with the assistance of the token channel or make direct use of the token channel in order to be able to exchange packet message information. The broadband subscriber terminals, by contrast, are centrally switched via the broadband space switching matrix network device in a known manner. This switching is enabled with the assistance of the central control of the broadband space switching matrix network device which has direct access to a central narrow band station accommodated in one of the sub-networks. The call requests and the signalings are conducted via the token channel of the hybrid loop in a known manner and the through-connection of a call between the broadband subscribers is produced via the broadband space switching matrix network device.

According to an advantageous feature of the invention, the sub-loop interface device is equipped with a branching device in which the multiplex data can be gated out in line group association (data of the broadband subscriber terminals to the broadband space switching matrix network device and data of the narrow band subscriber terminals to the appropriate sub-loop interface devive). It is therewith achieved that the broadband space switching matrix network device and the respective sub-networks need not undertake any additional evaluation of the data or, respectively, that the data transmitted in common in the frame and relevant for the respective transmission path are directly present for further processing.

A further advantageous feature of the invention is provided by the following combination of features:

1. The frame matching unit is followed by a demultiplex device formed of a frame synchronization device, of a time slot counting device and a decoder; and 2. The demultiplex device has a transmitting side connected to the broadband space switching matrix network device via a first line and connected to the following or, respectively, preceding subloop interface device via a second line. The data of the broadband subscriber terminals and of the narrow band subscriber terminals are thereby not only separated from one another but are also converted down with respect to their data rates such that, for example, it is not the full data rate, but only that portion of the data necessary for the broadband subscriber terminals that need be transmitted on the first line to the broadband space switching matrix network device. As a result the broadband space switching matrix network device can be manufactured in a more technologically favorable manner, particularly in a more cost-effective manner.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 3 illustrates the details of the frame structure for the combined transmission path;

FIG. 4 illustrates the details of corresponding data routes on the line sections.

DESCRIPTION OF THE PREFERRED EMBODIMENTS

Figure 1:
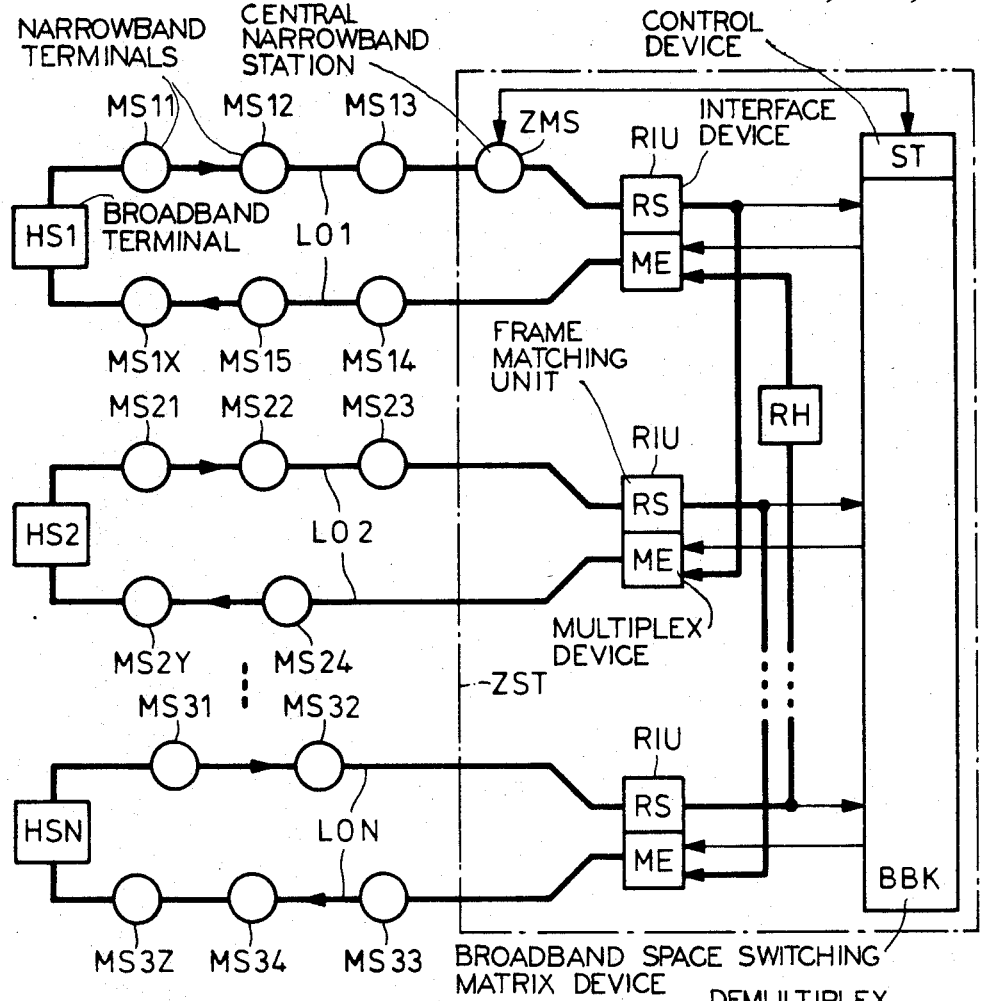
FIG. 1 is a schematic representation of a circuit arrangement constructed in accordance with the present invention.
Figure 2:
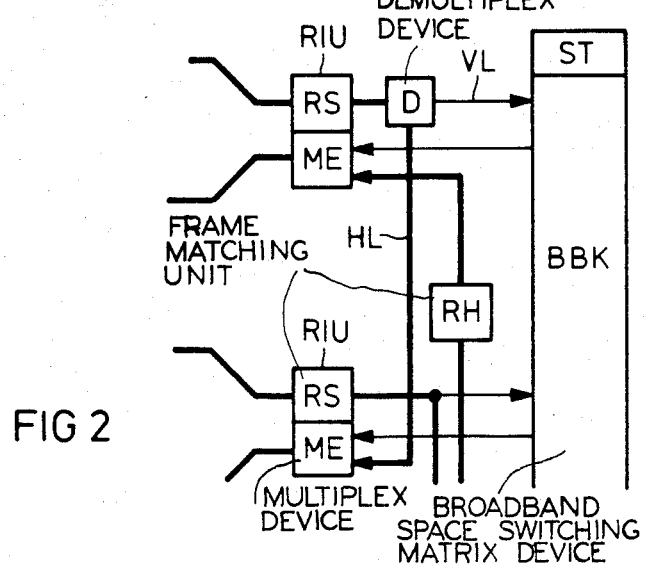
FIG. 2 is a schematic representation of an advantageous construction for practicing the present invention.

Referring to FIG. 1, a loop-configured local network is illustrated as being divided into sub-networks LO1--LON, whereby each sub-network LO1-LON is terminated with the sub-loop interface device RIU. A broadband subscriber terminal HS and a plurality of narrow band subscriber terminals MS are provided which supplement one another up to the maximally-transmittable data quantity within each of the sub-networks LO1--LON. Moreover, one of the sub-networks LO1-LON contains the central narrow band station ZMS which is directly influenced by a control device ST of the broadband space switching matrix network device BBK.

The sub-loop interface devices RIU are respectively equipped with a frame matching unit RS for frame synchronization and with a multiplex device ME for the formation of the new frame. It may be further seen that the respective sub-loop interface device RIU has its transmitting side and its receiving side connected to the centrally-controlled broadband space switching matrix network device BBK and has its transmitting side connected to a receiving input of the sub-loop interface device RIU of the respectively following loop sub-network LO or, respectively, has its receiving side connected to the transmitting output of the sub-loop interface device RIU of the respectively preceding loop sub-network LO. The data of the narrow band subscriber terminals MS are thereby transmitted exclusively via the decentrally-controlled loop structure of the sub-networks LO1-LON, whereas the data of the broadband subscriber terminals HS are gated out of the respective sub-network LO1-LON and are connected via a separate connecting path of the broadband space switching matrix network device BBK to the corresponding receiving input of the sub-network LO1-LON in which the desired broadband subscriber terminal HS is located. One respective broadband subscriber terminal equipment HS, as well as a plurality of narrow band subscriber terminals MS, are therefore provided in each of the sub-networks LO-LON connected to the central unit ZST. A frame structure according to FIG. 3 is employed for the simultaneous transmission of the data of a picture signal, data of a plurality of narrow band subscriber terminals and of a fast data signaling channel on the line system which is formed of light waveguides. The overall frame RD is thereby composed of three sub-frames, the sub-frame TV for the transmission of the data of the broadband subscriber terminal, the sub-frame S, the so-called stream sub-frame via which, for example, the narrow subscriber terminals transmit their voice information, and the sub-frame B (burst token) for a packet data transmission, for example given text transmission between office communications devices as narrow band subscriber terminal equipment. Together, the two latter sub-frames S and B thereby form a hybrid channel H. Further, the synchronization bit RS is contained in the overall frame RD. In order to keep the overall delay time within the loop network low in the combined transmission of the data, the duration of the frame RD is selected with overall length of 22 bits. One slot thereby devolves on the synchronizing bit, whereas two respective slots each are provided for the sub-frame TV, for the sub-frame S and for the sub-frame B. A value of 45 Mbit/s therefore derives for the overall data rate.

FIG. 4 again schematically illustrates the data route within the loop-configured network. One sub-network, for example the first loop, therefore forwards the data from the receive module EM to the frame matching device RS from which the data are transmitted to the broadband space switching matrix network device BBK via the branching device VZW over the first trunk VL to the multiplex device ME of the next sub-network, for example of the second loop, over the second line HL. The time diagram following therebelow shows the data courses at the places marked with the numerals 1-3 on the corresponding line. Therefore, the multiplex signal received from the frame matching device RS, together with the data for the broadband subscriber terminal and the hybrid data of the narrow band subscriber terminals are illustrated at the location 1. Due to the branching device VZW, only the data of the broadband subscriber terminal are transmitted at the location 2, the first trunk VL, whereas the hybrid data of the narrow band subscribers are transmitted at the location 3, the second trunk HL, being transmitted to the multiplex device ME for the formation of a new frame. It may be seen therefrom that the consistent continuation of the out-gating or, respectively, in-gating of data leads to the formation of a loop in which only the hybrid sub-frame circulate or, respectively, contain valid data. The sub-networks LO1-LON are therefore operated as an autonomous, decentrally-controlled loop, i.e. the slots for the narrow band subscriber terminals MS are allocated in a known manner with the assistance of the "token" without a central control being capable of influencing this procedure. The narrow band subscriber terminals MS having fast data transmission, for example in text transmissions, make use of this "token" in order to therefore be able to exchange their data with one another.

The broadband subscriber terminals HS, by contrast, are centrally switched by the broadband space switching matrix network device BBK in a traditional manner, whereby the call requests and, among other things, the signalings are also routed via the token channel of the hybrid group. The evaluation and the interaction of the controller ST of the broadband space switching matrix network device BBK occurs via the central narrow band station ZMS which is assigned to the central unit ZST.

As already mentioned above, the data of the individual sub-networks LO1-LON are supplied within the central unit ZST to the frame matching unit RS in which the transit time is supplemented to a whole multiple of the overall frame duration, 22 bit times in the present example. This switching measure is to be executed so that all frames of the sub-networks LO1-LON arrive in the central unit ZST frame synchronized and the periodicity of the frame circulation in the sub-networks LO1-LON is assured. Further, the correct ingating and out-gating of the data of the narrow band subscriber terminals HS into the corresponding sub-frames is achieved with the frame matching unit RS.

As a consequence of the out-coupling procedures of the data for the broadband subscriber terminals HS, in combination with the through-connection of these data via the broadband space switching matrix network device BBK, the loop network sub-divided into sub-networks LO1-LON produces a delay so that a delay element in the form a clocked shift register a few bits long must be connected into the line by way of which the data of the narrow band subscriber terminals MS are transmitted from one sub-loop interface device RIU to the next. The delay element can be integrated in the frame matching unit RS. Since the broadband space switching matrix network device BBK is likewise through-connected in a clocked manner, the time delay can be selected such that a constant delay occurs.

When the frame structure shown in FIG. 3 is employed, then a frame length of 512 bits (8 bits × 64 time slots) derives from the stream sub-frame S, including the frame synchronization. In order to guarantee the frame-synchronous circulation of these 64 narrow band time slot channels, an additional frame matching unit RH is provided in one of the loop connecting lines within the sub-networks LO1-LON. This must guarantee a frame circulation time within the extreme sub-frame S which amounts to a multiple of the frame duration RD, which is 22 bits in the present example. Here, for example, the frame matching unit RH must supplement to 256 × 11 = 2816 bits.

Figure 5:
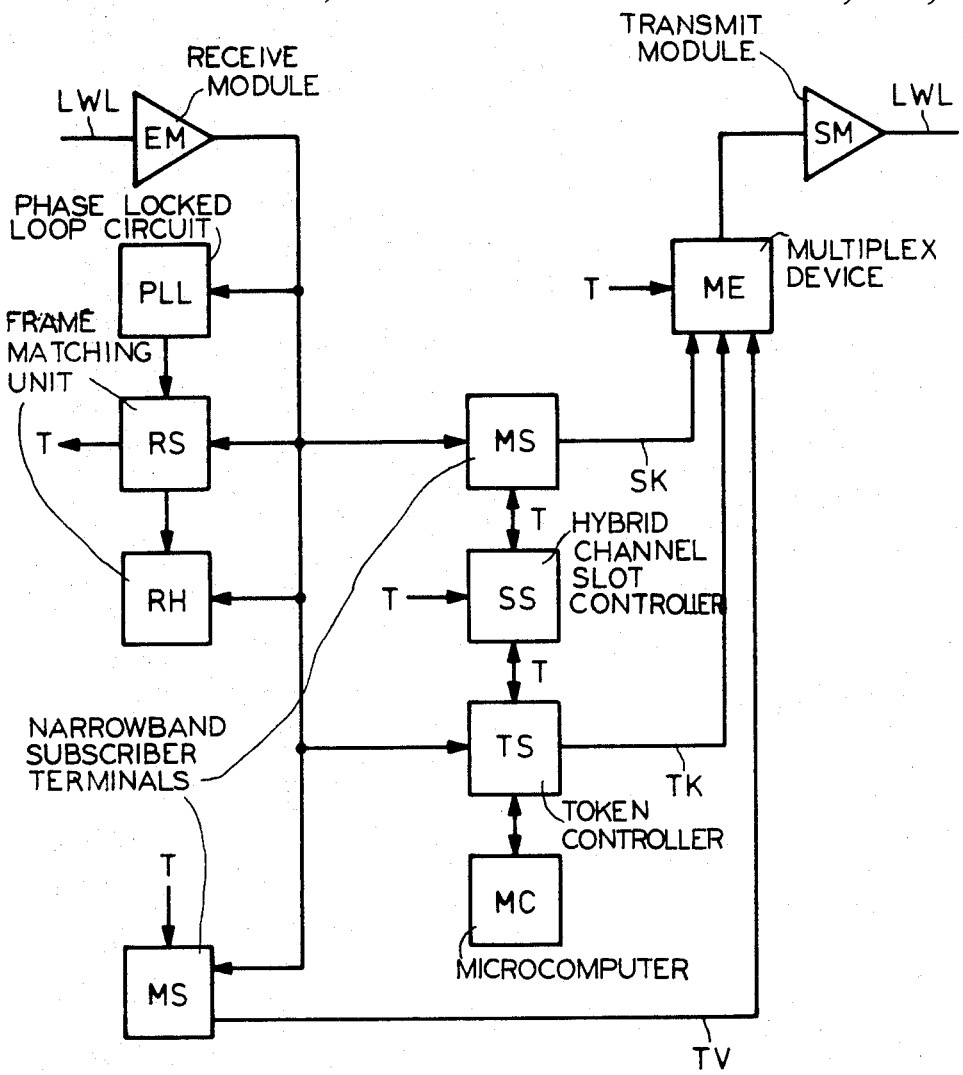
FIG. 5 is a block circuit diagram representation of a subscriber station comprising a broadband terminal and a narrow band terminal.

FIG. 5 is a block circuit diagram representation of a subscriber station comprising the broadband narrow band terminals. After the opto-electrical conversion of the data in the receiving module EM and the clock recovery in the phased lock loop circuit PLL, the frame clock signals T are derived in the frame matching unit RS or, respectively, RH, these frame clock signals T serving for the in-time in-gating and out-gating of the data into or, respectively, out of the three sub-frames, the sub-frame TV, the stream sub-frame S, and the burst sub-frame B (token sub-frame). In this manner, the connected broadband subscriber terminal HS (which, for example, can be a picture telephone), the connected narrow band subscriber terminal MS (only one narrow band subscriber terminal which, for example, can be realized as a digital telephone, is shown in the exemplary embodiment), and the connected micro-computer MC can be supplied with the appropriate frame clock signals. The slot controller SS which is responsible for the hybrid channel controls the in-time access to one of the narrow band time channels provided m-fold and to the token channel. The token controller TS analyzes what is referred to as the token protocol in the burst sub-frame B, where both the call set up and the call clear down for the TV channel and for all other slot channels of the stream sub-frame S are correspondingly controlled.

Before the data are transmitted by the transmit module SM, the output data from the three basic components (channel TV, stream channel S and burst channel B) are combined by the multiplex device ME such that the three data are interleaved in time.

The call setup between the narrow band subscriber terminal equipment MS within the loop network is controlled in a known manner by the token method and sequences independently of the remaining data exchange in the hybrid sub-frame which is established as an autonomous loop.

The broadband subscriber terminals HS, by contrast, are not decentrally-controlled in the call setup and call cleardown, but first likewise make use of a token and then, however, send the signaling data together with the corresponding connection request to the central narrow band station ZMS (FIG. 1) in the burst sub-frame. The central narrow band station ZMS subsequently transmits these information to the controller ST of the broadband space switching matrix network device BBK which subsequently through-connects the suitable connecting path through the space switching matrix network. The call cleardown is accomplished in the same manner.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a circuit arrangement for a communications system for the transmission of serial bit message information, particularly multiplex data transmission in optical transmission systems comprising light waveguides, the circuit arrangement being of the type comprising a loop local network including broadband and narrow band terminals adapted to different types of data transmission with respect to quantity of data transmission and data transmission rate within a frame and the method of transmission, the improvement comprising:
   a plurality of loop sub-networks in the loop local network, each of said loop sub-networks comprising at least one broadband terminal and a plurality of narrow band terminals serially connected via light wageguides and supplementing one another up to the maximum data quanity with respect to the maximum quantity of data to be transmitted in a frame within a predetermined time;
   a centrally-controlled broadband space switching matrix device;
   a plurality of sub-loop interface devices each including first and second transmitting outputs and first and second receiving inputs, said first transmitting output connected to said broadband space switching matrix device and to said first receiving input of an adjacent sub-loop interface device, said first receiving input connected to said broadband space switching matrix device, and said second transmitting output and said second receiving input connected to the light waveguides of the respective loop sub-networks and each of said interface devices acquiring the data of said broadband and narrow band terminals;
   each of said sub-loop interface devices comprising a frame matching unit for augmenting transit time in the respective loop sub-netwoork to a whole multiple of the frame duration, and a multiplex device for combining the data received from said broadband space switching matrix device and the adjacent sub-network to form a new, complete frame; and
   a central narrow band station connected in one of said loop sub-networks and connected to and controlled by said broadband space switching matrix device to control call setup and clear down between said broadband terminals via said broadband space switching matrix device.

2. The improved circuit arrangement of claim 1, wherein:
   each of said sub-loop interface devices comprises a data branching device for gating out the data of a broadband terminal to said matrix device and the data of said narrowband terminals to the adjacent sub-loop interface device.

3. The improved circuit arrangement of claim 1, and further comprising:
   a plurality of demultiplex devices, each connected to a respective frame matching unit, and each including frame synchronization means, time slot counting means, and decoding means, a first transmitting output connected to said broadband space switching matrix device and a second transmitting output connected to an adjacent sub-loop interface device.

* * * * *